United States Patent
Yamazaki et al.

(10) Patent No.: US 11,796,994 B2
(45) Date of Patent: Oct. 24, 2023

(54) PARKING SUPPORT DEVICE, PARKING SUPPORT SYSTEM, AND PARKING SUPPORT METHOD

(71) Applicant: Faurecia Clarion Electronics Co., Ltd., Saitama (JP)

(72) Inventors: Koki Yamazaki, Saitama (JP); Makoto Ishinoda, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 196 days.

(21) Appl. No.: 17/163,612

(22) Filed: Feb. 1, 2021

(65) Prior Publication Data

US 2021/0255614 A1 Aug. 19, 2021

(30) Foreign Application Priority Data

Feb. 13, 2020 (JP) ................................ 2020-022263

(51) Int. Cl.
*G05D 1/00* (2006.01)
*H04W 4/40* (2018.01)
(Continued)

(52) U.S. Cl.
CPC ........... *G05D 1/0011* (2013.01); *B60W 30/06* (2013.01); *G01C 21/34* (2013.01); *H04W 4/40* (2018.02);
(Continued)

(58) Field of Classification Search
CPC ...... G05D 1/0011; H04W 4/40; B60W 30/06; B60W 2556/50; B60W 2520/04; G01C 21/34

See application file for complete search history.

(56) References Cited

U.S. PATENT DOCUMENTS

2012/0316704 A1 12/2012 Ohbayashi et al.
2017/0183004 A1* 6/2017 Bonarens ............... G08G 1/165
(Continued)

FOREIGN PATENT DOCUMENTS

| JP | 2018-163112 A | 10/2018 |
| WO | 2011/101951 A1 | 8/2011 |
| WO | 2019/123586 A1 | 6/2019 |

OTHER PUBLICATIONS

European Office Action mailed by European Patent Office dated Jun. 21, 2022 in corresponding European patent application No. 21 155 828.3-1009.
(Continued)

*Primary Examiner* — Ig T An
*Assistant Examiner* — Stephanie T Su
(74) *Attorney, Agent, or Firm* — IP BUSINESS SOLUTIONS, LLC

(57) ABSTRACT

When having determined that an own-vehicle has become unable to proceed in a traveling direction corresponding to a travel path of the own-vehicle and has stopped halfway through a travel path, a parking support device transmits information to an operation terminal, the information indicating a travel path and a place at which the vehicle has stopped on the travel path. When having received, from the operation terminal, specification information specifying a place to which the own-vehicle is to be moved, the parking support device sets, as a travel path of the own-vehicle, a path through which the own-vehicle is to be moved to the specified place, and outputs, to a vehicle control unit, control information for causing the own-vehicle to move to the specified place.

3 Claims, 12 Drawing Sheets

(51) Int. Cl.
  *B60W 30/06*  (2006.01)
  *G01C 21/34*  (2006.01)
(52) U.S. Cl.
  CPC ..... *B60W 2520/04* (2013.01); *B60W 2556/50* (2020.02)

(56) References Cited

U.S. PATENT DOCUMENTS

2020/0055522 A1* 2/2020 Kasai .................. G06F 11/0739
2021/0086758 A1* 3/2021 Yamanaka ............. G08G 1/144
2021/0086762 A1* 3/2021 Shimamoto ............ G08G 1/144

OTHER PUBLICATIONS

Extended European Search Report mailed by European Patent Office dated Jun. 25, 2021 in corresponding European patent application No. 21155828.3-1009.

* cited by examiner

PARKING SUPPORT DEVICE, PARKING SUPPORT SYSTEM, AND PARKING SUPPORT METHOD

INCORPORATION BY REFERENCE

The present application claims priority under 35 U.S.C. § 119 to Japanese Patent Application No. 2020-022263 filed on Feb. 13, 2020. The content of the applications is incorporated herein by reference in its entirety.

BACKGROUND OF THE INVENTION

Field of the Invention

The present invention relates to a parking support device, a parking support system, and a parking support method.

Description of the Related Art

A technology with which a user remotely operates a vehicle from outside the vehicle has been known. For example, Patent Literature 1 discloses a vehicle remote operation system including a movement disabling unit configured to disable movement of a vehicle when the vehicle is remotely operated through a communication terminal while a door of the vehicle is not locked.

CITATION LIST

Patent Literature

Patent Literature 1
International Publication No. WO 2011/101951

There has been a case in which a vehicle cannot move to a target parking position due to an obstacle or the like on a travel path when the vehicle is to be parked at the target parking position through travel support by a parking support device while a user is not on board the vehicle. In this case, when the vehicle is stopping at a stop position, the user cannot get on the vehicle due to the obstacle or the like in some cases.

The present invention is intended to solve the above-described problem and improve convenience when a vehicle has become unable to proceed in a traveling direction halfway through a travel path.

SUMMARY OF THE INVENTION

To solve the above-described problem, a parking support device of an aspect of the present invention is a parking support device mounted on a vehicle. The parking support device includes a path generation unit, a travel control unit, and a determination unit. The path generation unit is configured to generate a path through which the vehicle is to be moved from a current position and parked at a target parking position. The travel control unit is configured to set, as a travel path of the vehicle, the path generated by the path generation unit and generate control information for causing the vehicle to travel in accordance with the set travel path, the travel control unit configured to output the generated control information to a vehicle control device configured to control travel of the vehicle. The determination unit is configured to determine whether the vehicle has become unable to proceed in a traveling direction corresponding to the travel path and has stopped halfway through the travel path. When having determined that the vehicle has stopped, the determination unit causes a wireless communication unit to transmit information to an external device, the information indicating the travel path and a place at which the vehicle has stopped on the travel path. When having received, from the external device, specification information that specifies a place to which the vehicle is to be moved, the travel control unit sets, as a travel path of the vehicle, a path through which the vehicle is to be moved to the place specified by the specification information, and the travel control unit outputs, to the vehicle control device, control information for moving the vehicle to the place specified by the specification information.

Advantageous Effect of Invention

According to an aspect of the present invention, it is possible to improve convenience when a vehicle has become unable to proceed in a traveling direction halfway through a travel path.

DETAILED DESCRIPTION OF THE PREFERRED EMBODIMENT

A preferable embodiment of the present invention will be described below with reference to the accompanying drawings.

Figure 1:
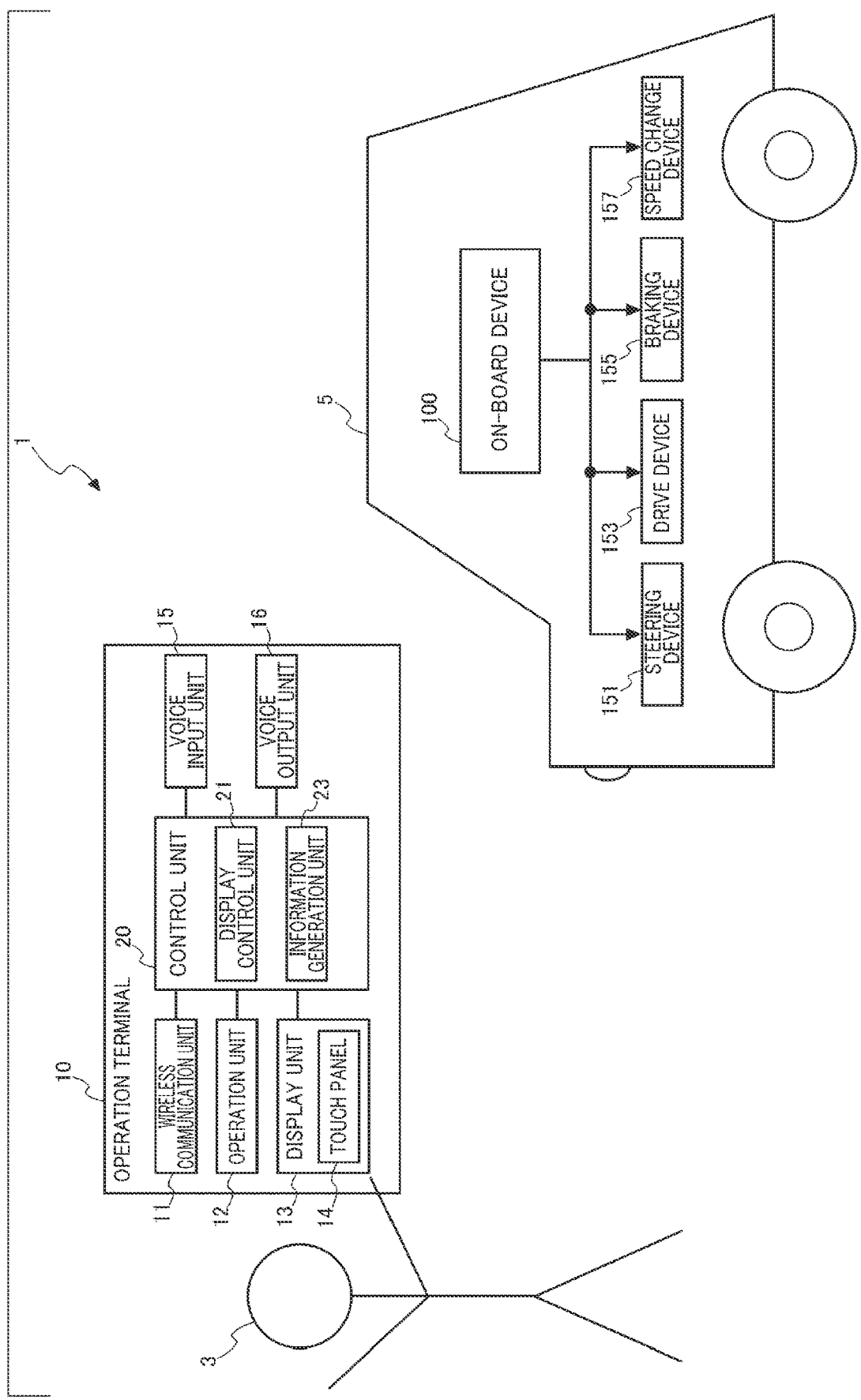
FIG. 1 is a diagram illustrating a system configuration of a parking support system.

FIG. 1 is a system configuration diagram of a parking support system 1.

The parking support system 1 includes an on-board device 100 mounted on a vehicle, and an operation terminal 10 configured to remotely operate the on-board device 100. The operation terminal 10 corresponds to an external device of the present invention.

The operation terminal 10 and the on-board device 100 are connected with each other through wireless communication. A communication scheme of the wireless communication connecting the operation terminal 10 and the on-board device 100 is any optional scheme that assures a communication distance equal to or longer than a predetermined distance, and may employ, for example, Wi-Fi (registered trademark) or Bluetooth (registered trademark).

Hereinafter, the vehicle on which the on-board device 100 is mounted is referred to as an own-vehicle 5.

The operation terminal 10 is a terminal through which the on-board device 100 is operated, and is a mobile electronic device having a function to receive an operation from a user 3 and a function to display various kinds of information. The operation terminal 10 may be, for example, a smartphone or a tablet PC (personal computer). The operation terminal 10 receives various operations from the user 3, such as an operation to start parking support and an operation to select a parking position at which the own-vehicle 5 is to be parked. The operation terminal 10 transmits results of the operations to the on-board device 100.

The on-board device 100 supports automated parking of the own-vehicle 5. Specifically, the on-board device 100 detects a parking region around the own-vehicle 5, superimposes, on a captured image obtained by capturing the detected parking region, an image of a figure or the like representing the parking region, and transmits the resulting image to the operation terminal 10. When having received, from the operation terminal 10, information specifying a parking region in which the own-vehicle 5 is to be parked, the on-board device 100 sets a target parking position in the specified parking region, and generates a travel path through which the own-vehicle 5 is to be moved to the set target parking position. Then, the on-board device 100 causes the own-vehicle 5 to travel along the travel path and parks the own-vehicle 5 at the target parking position by controlling a steering device 151, a drive device 153, a braking device 155, and a speed change device 157, which are mounted on the own-vehicle 5.

Subsequently, a configuration of the operation terminal 10 will be described below.

The operation terminal 10 includes a wireless communication unit 11 (transceiver/receiver), an operation unit 12, a display unit 13 (display), a voice input unit 15 (microphone), a voice output unit 16 (speaker), and a control unit 20.

The wireless communication unit 11 transmits and receives various kinds of data by performing wireless communication with the on-board device 100 in accordance with control by the control unit 20.

The operation unit 12 includes hardware components such as a button and a switch and functions as a reception unit configured to receive an operation from the user 3. Illustrations of the button and the switch are omitted. When the button or the switch is operated, the operation unit 12 outputs, to the control unit 20, an operation signal corresponding to the operated button or switch.

The display unit 13 includes a touch panel 14. The touch panel 14 includes a display panel such as a liquid crystal panel, and a touch sensor of a resistive scheme, a capacitive scheme, or the like. The touch panel 14 detects an operation position of a touch operation on the touch panel 14 and outputs an operation signal indicating the detected operation position to the control unit 20.

The voice input unit 15 receives, as voice data, voice emitted from the user 3 and outputs the received voice data to the control unit 20. The voice output unit 16 externally outputs voice corresponding to voice data input from the control unit 20.

The control unit 20 includes a processor such as a central processing unit (CPU) or a micro-processing unit (MPU), and a memory such as a random access memory (RAM) or a flash memory. Illustrations of the processor and the memory are omitted. The control unit 20 controls each component of the operation terminal 10 through the processor executing a control program stored in the memory. Examples of the control program include an application program downloaded from a server device.

The control unit 20 includes, as functional components, a display control unit 21 and an information generation unit 23.

The display control unit 21 causes the touch panel 14 to display information received from the on-board device 100.

The information generation unit 23 generates information to be transmitted to the on-board device 100 and transmits the generated information to the on-board device 100. The information generated by the information generation unit 23 includes specification information. The specification information specifies a place to which the own-vehicle 5 is to be moved when the own-vehicle 5 has become unable to move in a traveling direction corresponding to a travel path generated by the on-board device 100 and has stopped while moving on the travel path.

Figure 2:
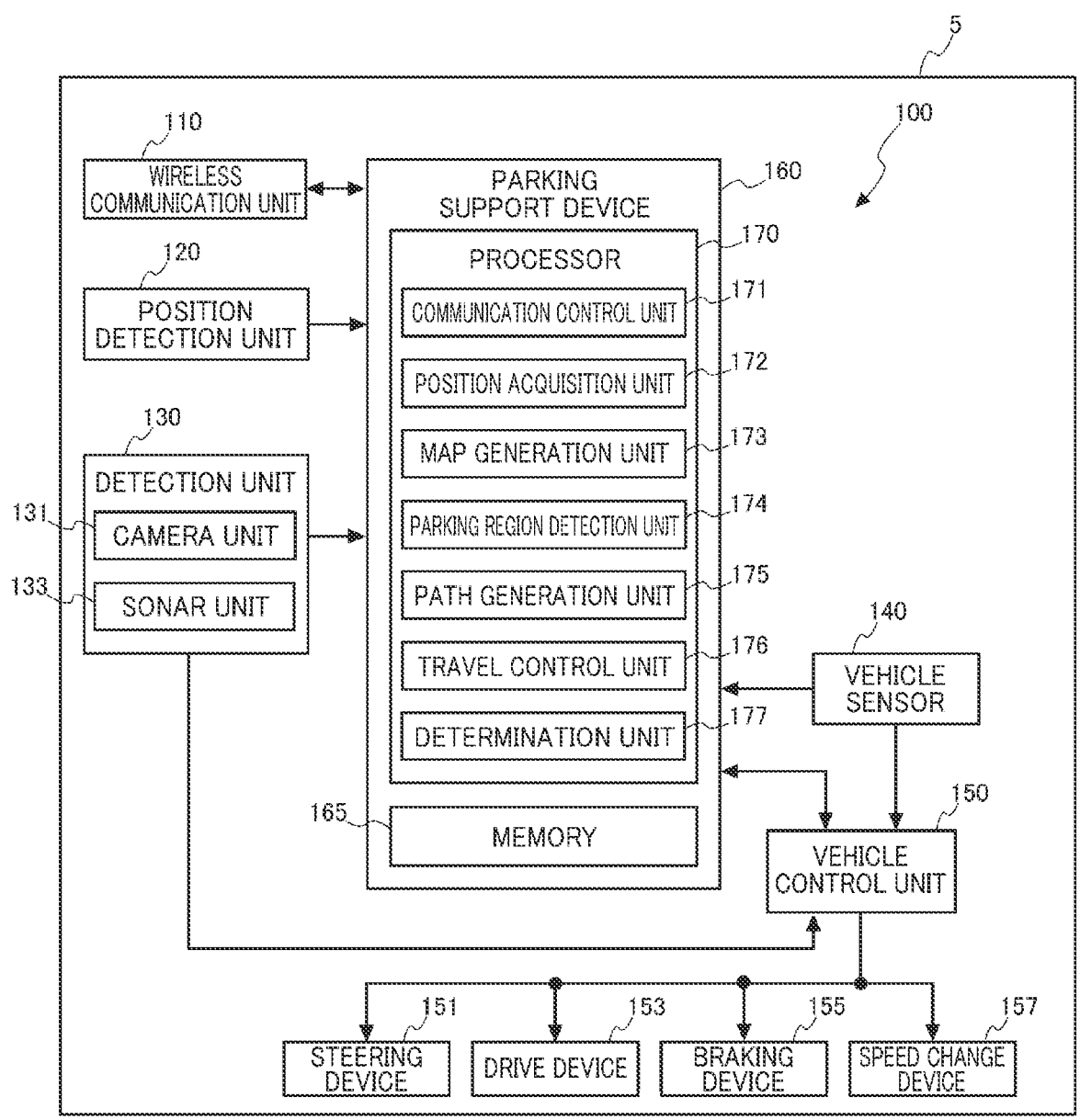
FIG. 2 is a diagram illustrating a configuration of a parking support device.

FIG. 2 is a block diagram illustrating a configuration of the on-board device 100.

The configuration of the on-board device 100 will be described below with reference to FIG. 2.

The on-board device 100 includes a wireless communication unit 110 (transceiver/receiver), a position detection unit 120, a detection unit 130, a vehicle sensor 140, a vehicle control unit 150, and a parking support device 160.

The wireless communication unit 110 transmits and receives various kinds of data by performing wireless communication with the operation terminal 10 in accordance with control by the parking support device 160.

The position detection unit 120 detects a current position of the own-vehicle 5. The position detection unit 120 includes a Global Navigation Satellite System (GNSS) receiver configured to receive a GNSS signal, and a processor configured to compute the current position of the own-vehicle 5 based on the GNSS signal received by the GNSS receiver. Illustrations of the GNSS receiver and the processor are omitted. The position detection unit 120 outputs position information indicating the current position of the own-vehicle 5, which is obtained by the computation, to the parking support device 160.

The detection unit 130 includes one or a plurality of sensors configured to detect an obstacle 7 around the own-vehicle 5 and detect, for example, a distance between the detected obstacle 7 and the own-vehicle 5. The detection unit 130 of the present embodiment includes, as the sensors, a camera unit 131 and a sonar unit 133 (sonar), but sensors that may be mounted on the detection unit 130 are not limited to the camera unit 131 and the sonar unit 133. For example, a radar and a laser imaging detection and ranging (lidar), which are capable of measuring the distance to the obstacle 7 by using electronic wave, light, and the like, may be mounted on the detection unit 130.

The camera unit 131 includes cameras mounted at a plurality of places on the own-vehicle 5, for example, on the front, back, left, and right sides of the own-vehicle 5. View angles of these cameras are adjusted so that image capturing is possible in a range of 360 degrees about the own-vehicle 5. Each camera of the camera unit 131 includes an image sensor such as a charge-coupled device (CCD) or a complementary metal-oxide-semiconductor (CMOS), and a data processing circuit configured to generate a captured image based on a light receiving state of the image sensor. Each camera of the camera unit 131 generates a captured image by performing image capturing of the corresponding image capturing range at a predetermined frame rate. The camera unit 131 outputs each generated captured image to the parking support device 160. The parking support device 160 temporarily stores the input captured image in a memory 165.

The sonar units 133 are mounted at a plurality of places on the own-vehicle 5, for example, on the front, back, left, and right sides and detects a size of the obstacle 7 around the own-vehicle 5, the distance to the obstacle 7, and the like by using ultrasonic wave.

The vehicle sensor 140 is mounted on the own-vehicle 5. Examples of the vehicle sensor 140 mounted on the own-vehicle 5 include a shift position sensor, a vehicle speed sensor, a brake sensor, and a rudder angle sensor. Illustrations of the shift position sensor, the vehicle speed sensor, the brake sensor, and the rudder angle sensor are omitted.

The vehicle control unit 150 corresponds to a vehicle control device of the present invention. The vehicle control unit 150 receives an image captured by the camera unit 131 and a sensor value of the sonar unit 133. The vehicle control unit 150 also receives a sensor value of the vehicle sensor 140 as a detection result.

The vehicle control unit 150 is, for example, a unit including a computer such as an electronic control unit (ECU) and configured to control the steering device 151, the drive device 153, the braking device 155, and the speed change device 157.

The vehicle control unit 150 performs feedback control of the steering device 151, the drive device 153, and the braking device 155 based on control information input from the parking support device 160 and sensor values of the vehicle speed sensor, the brake sensor, and the rudder angle sensor, and causes the own-vehicle 5 to travel in accordance with a travel path generated by the parking support device 160.

When the obstacle 7 is detected by the detection unit 130 and the detected obstacle 7 is going to contact the own-vehicle 5, the vehicle control unit 150 executes evasive travel for evading contact with the obstacle 7. The evasive travel is travel for evading contact between the own-vehicle 5 and the obstacle 7 by causing the own-vehicle 5 to travel on a path deviating from a travel path generated by the parking support device 160 to be described later. When the own-vehicle 5 is traveling on the path deviating from the travel path after execution of the evasive travel, the vehicle control unit 150 executes recovery travel for returning the path of the own-vehicle 5 to the travel path.

The vehicle control unit 150 is connected with the steering device 151, the drive device 153, the braking device 155, and the speed change device 157 through an on-board network such as a controller area network (CAN) or an Ethernet (registered trademark).

The steering device 151 includes an actuator configured to steer a steering wheel of the own-vehicle 5. The vehicle control unit 150 changes a steering angle of the steering wheel by driving this actuator, thereby controlling the traveling direction of the own-vehicle 5.

The drive device 153 includes an actuator configured to adjust drive power of drive wheels of the own-vehicle 5. This actuator is a throttle actuator when a power source of the own-vehicle 5 is an engine, or the actuator is a motor when the power source is the motor. The vehicle control unit 150 controls the drive power of the own-vehicle 5 by driving the actuator.

The braking device 155 includes an actuator configured to control braking force applied to the wheels of the own-vehicle 5. The vehicle control unit 150 applies braking force to the wheels by driving this actuator, thereby decelerating a vehicle speed of the own-vehicle 5.

The speed change device 157 includes a transmission and an actuator. The vehicle control unit 150 changes a shift position of the transmission by driving this actuator, thereby changing a gear ratio of the transmission or switching the traveling direction of the own-vehicle 5 to forward or backward.

The parking support device 160 is a computer including a processor 170 such as a CPU or an MPU, and the memory 165 such as a read only memory (ROM) or a RAM. In addition to these hardware components, the parking support device 160 includes an interface circuit for connection with storage devices such as a hard disk drive (HDD) and a solid state drive (SSD), sensors, peripheral instruments, and the like, and also includes an on-board network communication circuit configured to perform communication with another on-board device through the on-board network. The parking support device 160 achieves various functional components through the processor 170 executing a control program stored in the memory 165.

The memory 165 stores the control program executed by the processor 170, an image captured by the camera unit 131, a sensor value of the sonar unit 133, map data generated by a map generation unit 173 to be described later, and the like.

The parking support device 160 includes, as functional components, a communication control unit 171, a position acquisition unit 172, the map generation unit 173, a parking region detection unit 174, a path generation unit 175, a travel control unit 176, and a determination unit 177.

The communication control unit 171 transmits and receives various kinds of data to and from the operation terminal 10 by controlling the wireless communication unit 110.

The position acquisition unit 172 receives, as the position information, the current position of the own-vehicle 5, which is calculated by the position detection unit 120. The position acquisition unit 172 estimates the current position of the own-vehicle 5 by using a publicly-known or well-known dead reckoning method and corrects, the current position of the own-vehicle, which is input from the position detection unit 120, based on a result of the estimation.

The map generation unit 173 generates map data in which the obstacle 7 around the own-vehicle 5 and the current position of the own-vehicle 5 are recorded in a local coordinate system. This map data is generated in the memory 165. The obstacle 7 is any object that encumbers or restricts travel of the own-vehicle 5. Examples of the obstacle 7 include constructions such as a column and a wall, poles and ground parking partition lines that partition a travel region in which the own-vehicle 5 can travel and a parking region, other vehicles, carts, and pedestrians.

The map generation unit 173 sequentially updates the current position of the own-vehicle 5 and the position and size of the obstacle 7 as pieces of registration information in map data based on the current position of the own-vehicle 5, which is sequentially input from the position acquisition unit 172, and a detection result of the obstacle 7, which is sequentially input from the detection unit 130.

Although the present embodiment describes a case in which the map generation unit 173 generates map data, the parking support device 160 may acquire map data in which the position of each obstacle 7 such as a column or a wall in a car park is recorded in advance. For example, the parking support device 160 may download map data from a server device or may read map data stored in the memory 165 in advance. In this case, the parking support device 160 generates map data by recording, to the acquired map data, the current position of the own-vehicle 5, which is input from the position acquisition unit 172, and the position of the obstacle 7, which is detected by the detection unit 130.

The parking region detection unit 174 detects a parking region in which the own-vehicle 5 can be parked. Hereinafter, a region in which the own-vehicle 5 can be parked is referred to as a "parking possible region". A "parking region" includes a region in which another vehicle is parked and the own-vehicle 5 cannot be parked. The parking region detection unit 174 detects a parking possible region based on map data generated by the map generation unit 173 and an image captured by the camera unit 131. For example, the parking region detection unit 174 detects any parking partition line drawn on a road surface by analyzing the image captured by the camera unit 131. The parking partition line is a white line that partitions a parking region. The parking region detection unit 174 specifies positions of parking regions based on the detected parking partition line and selects, based on the map data, a parking possible region in which no obstacle 7 such as another vehicle exists among the specified parking regions.

The parking region detection unit 174 generates an image in which a figure representing the position of a parking possible region, identification information, and the like are superimposed on the image captured by the camera unit 131. The generated image is referred to as a position selection image. The generated position selection image is transmitted to the operation terminal 10 through the wireless communication unit 110 under control by the communication control unit 171. In addition, the parking region detection unit 174 stores, in the memory 165, correspondence information that associates the identification information identifying the parking possible region with the position of the parking possible region on the map data.

The operation terminal 10 causes the touch panel 14 to display the position selection image received from the on-board device 100. The user 3 sees the position selection image displayed on the touch panel 14 and selects, through a touch operation, a parking possible region in which the own-vehicle 5 is to be parked. The operation terminal 10 transmits, to the on-board device 100, identification information identifying the parking possible region selected through the touch operation in the position selection image.

The path generation unit 175 specifies, based on the identification information received from the operation terminal 10, the parking possible region selected by the user 3. The path generation unit 175 also specifies the position of the selected parking possible region on the map data by referring to the correspondence information. Having specified the position of the selected parking possible region on the map data, the path generation unit 175 sets, in the selected parking possible region, a target parking position at which the own-vehicle 5 is to be parked, and generates a path through which the own-vehicle 5 is to be moved from the current position and parked at the target parking position. In this manner, the path generation unit 175 generates, based on the map data, a path through which the own-vehicle 5 is to be parked at the target parking position without contact with the obstacle 7. In the present specification, "contact" includes a case in which the own-vehicle 5 collides with the obstacle 7 and becomes unable to proceed in the traveling direction. Moreover, a case in which, although the own-vehicle 5 does not contact the obstacle 7, the distance between the own-vehicle 5 and the obstacle 7 is equal to or shorter than a distance set in advance and a passenger has a feeling of insecurity for contact between the own-vehicle 5 and the obstacle 7 may be determined as contact. The path generation unit 175 outputs information of the generated path to the travel control unit 176.

The travel control unit 176 sets, as a travel path R1 to be traveled by the own-vehicle 5, the path generated by the path generation unit 175, and generates control information for causing the own-vehicle 5 to travel in accordance with the set travel path R1. The control information includes information for causing the own-vehicle 5 to travel along the travel path R1 and for controlling each of steering, drive, braking, and speed change.

Figure 3:
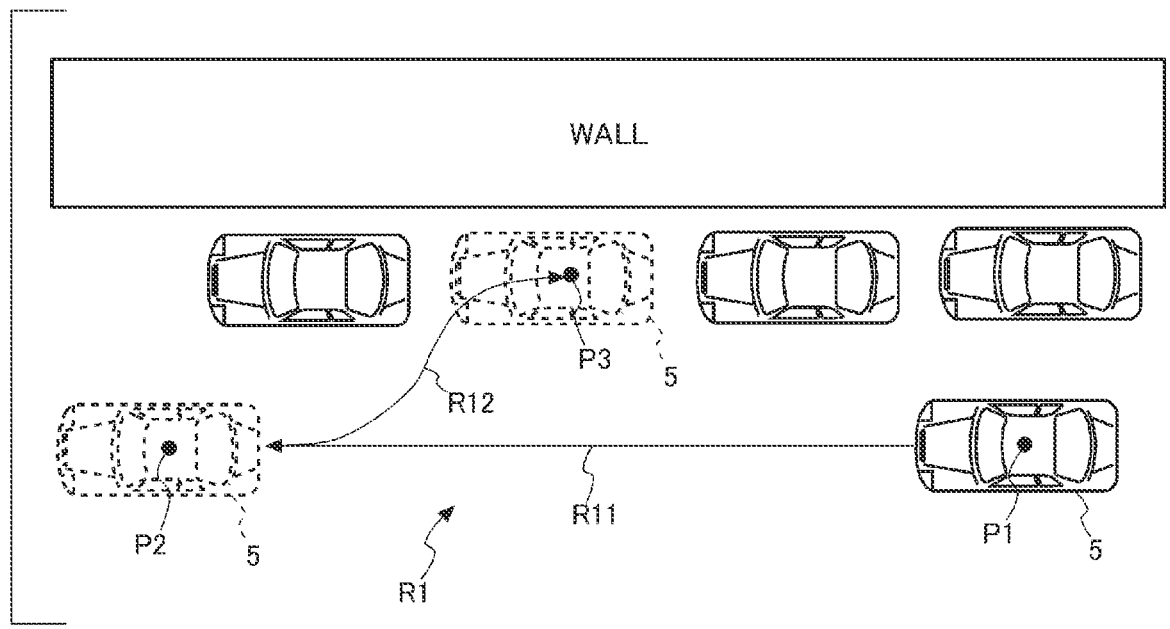
FIG. 3 is a diagram illustrating an exemplary travel path.

FIG. 3 is a diagram illustrating an exemplary travel path R1.

The travel path R1 sometimes includes a path on which, after having started traveling, the own-vehicle 5 temporarily stops traveling and changes the traveling direction. The change of the traveling direction includes a case in which the own-vehicle 5 is changed from forward traveling to backward traveling and a case in which the own-vehicle 5 is changed from backward traveling to forward traveling. Hereinafter, a position at which the own-vehicle 5 is temporarily stopped to change the traveling direction is referred to as a middle position. The middle position may include a position at which the own-vehicle 5 turns left and a position at which the own-vehicle 5 turns right. The middle position corresponds to a change place of the present invention.

For example, assume that the travel path R1 is constituted by a path R11 and a path R12 illustrated in FIG. 3. In the travel path R1 illustrated in FIG. 3, the path R11 is an interval in which the own-vehicle 5 travels forward, and the path R12 is an interval in which the own-vehicle 5 travels backward. The travel path R1 includes three positions P1, P2, and P3. The position P1 corresponds to the current position of the own-vehicle 5, the position P2 corresponds to the middle position, and the position P3 corresponds to the target parking position. Hereinafter, the position P1 is referred to as a start position P1, the position P2 is referred to as a middle position P2, and the position P3 is referred to as a target parking position P3. The start position P1 corresponds to a start place of the present invention. The own-vehicle 5 departs at the start position P1 and moves by forward traveling along the path R11. Having reached the middle position P2, the own-vehicle 5 temporarily stops and switches the traveling direction from forward travel to backward travel. Thereafter, the own-vehicle 5 travels backward along the path R12 and is parked at the target parking position P3. The travel path R1 illustrated in FIG. 3 corresponds to a case in which the middle position P2 is the only one middle position, but a plurality of middle positions may be included in the travel path R1.

The determination unit 177 receives the current position of the own-vehicle 5, which is acquired by the position acquisition unit 172, an image captured by the camera unit 131, sensor values of the sonar unit 133 and the vehicle speed sensor included in the vehicle sensor 140, and the like.

The determination unit 177 also receives a notification signal from the vehicle control unit 150. The notification signal is a signal for notification when the vehicle control unit 150 has caused the own-vehicle 5 to stop traveling. The vehicle control unit 150 outputs the notification signal to the determination unit 177 when the own-vehicle 5 has been caused to temporarily stop traveling at the middle position P2, when the own-vehicle 5 has reached the target parking position P3, or when the own-vehicle 5 is emergently stopped upon determination that the own-vehicle 5 cannot evade contact with the obstacle 7 by continuing traveling.

Having received the notification signal from the vehicle control unit 150, the determination unit 177 determines whether the own-vehicle 5 has become unable to proceed in the traveling direction and has stopped. Hereinafter, emergency stop refers to a case in which the own-vehicle 5 has become unable to proceed in the traveling direction and has stopped due to the obstacle 7 or the like.

To determine whether the stop of the own-vehicle 5 is emergency stop, the determination unit 177 determines whether the stop of the own-vehicle 5 is continuing for a predetermined time or longer based on a sensor value of the vehicle speed sensor. The determination of whether the stop of the own-vehicle 5 is continuing for the predetermined time or longer is performed to exclude stop to change the traveling direction at the middle position P2, stop to evade contact with another vehicle as an oncoming vehicle, and the like.

Figure 4:
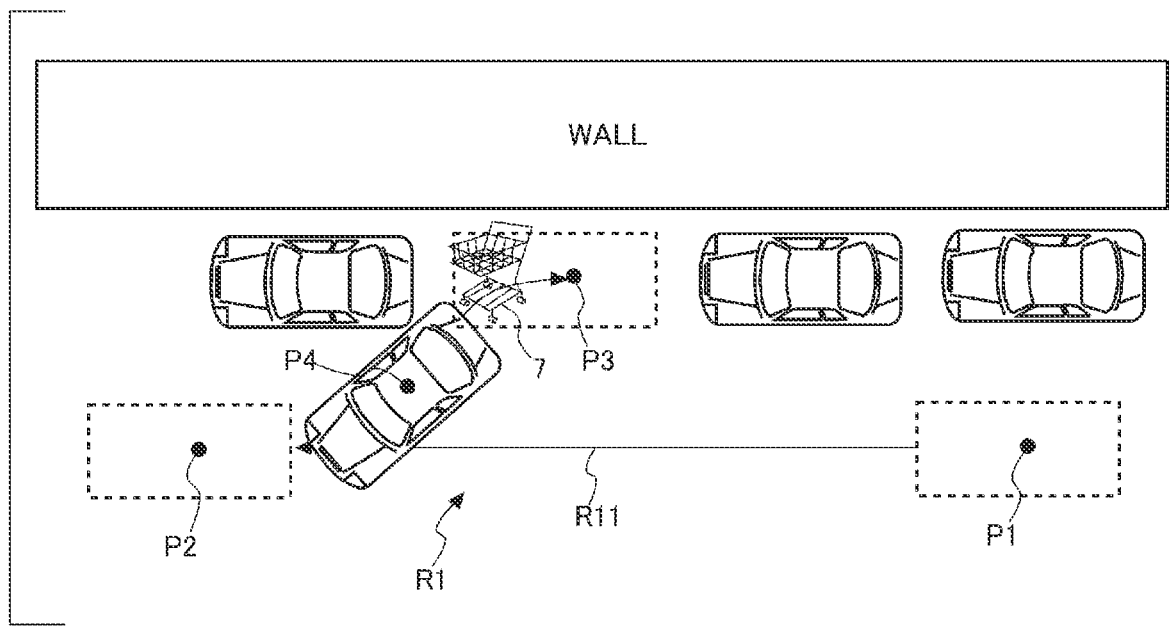
FIG. 4 is a diagram illustrating the exemplary travel path when an own-vehicle has emergently stopped.

FIG. 4 illustrates a state in which the own-vehicle 5 has emergently stopped.

When having determined that the stop of the own-vehicle 5 is continued for the predetermined time or longer, the determination unit 177 determines whether the current position of the own-vehicle 5 is the target parking position P3. When the current position of the own-vehicle 5 is the target parking position P3, the determination unit 177 determines that parking at the target parking position P3 is completed. When the current position of the own-vehicle 5 is a position other than the target parking position P3, the determination unit 177 determines whether the obstacle 7 has been detected in the traveling direction of the own-vehicle 5 based on an image captured by the camera unit 131 and sensor values of the sonar units 133.

FIG. 4 illustrates a state in which the obstacle 7 is detected in the traveling direction of the own-vehicle 5 and the own-vehicle 5 has emergently stopped at a position P4. Hereinafter, the position P4 is referred to as the emergency stop position P4. As illustrated in FIG. 4, when the obstacle 7 is detected in the traveling direction of the own-vehicle 5, the determination unit 177 determines that the own-vehicle 5 has emergently stopped.

When having determined that the own-vehicle 5 has emergently stopped, the determination unit 177 determines whether the own-vehicle 5 can travel from the emergency stop position P4 to the start position P1 and the middle position P2 on the travel path R1. A path through which the own-vehicle 5 is to travel in this case is a path through which the own-vehicle 5 returns, in a direction from the emergency stop position P4 to the start position P1, on the travel path R1 through which the own-vehicle 5 has already traveled from the start position P1 to the emergency stop position P4. The determination unit 177 determines, based on an image captured by the camera unit 131 and sensor values of the sonar units 133, whether there is any obstacle 7 that would contact the own-vehicle 5 when the own-vehicle 5 returns on the travel path R1 in a direction to the start position P1 and the middle position P2.

When having determined that the own-vehicle 5 cannot return to the start position P1 or the middle position P2, the determination unit 177 controls the wireless communication unit 110 to transmit information notifying that traveling is impossible to the operation terminal 10.

When having determined that the own-vehicle 5 can return to the middle position P2 and the start position P1, the determination unit 177 controls the wireless communication unit 110 to transmit information indicating the travel path R1, the emergency stop position P4 at which the own-vehicle 5 has emergently stopped, the middle position P2, and the start position P1 to the operation terminal 10. For example, the determination unit 177 may control the wireless communication unit 110 to transmit information indicating a positional relation between each of the middle position P2 and the start position P1 on the travel path R1 and the emergency stop position P4 to the operation terminal 10.

When having determined that the own-vehicle 5 can return to the middle position P2 but cannot return to the start position P1, the determination unit 177 controls the wireless communication unit 110 to transmit information indicating the travel path R1, the emergency stop position P4 at which the own-vehicle 5 has emergently stopped, and the middle position P2 to the operation terminal 10. For example, the determination unit 177 may control the wireless communication unit 110 to transmit information indicating a positional relation between the middle position P2 on the travel path R1 and the emergency stop position P4 to the operation terminal 10.

FIGS. 5 to 8 are diagrams illustrating display screens displayed on the touch panel 14 of the operation terminal 10.

The following describes a display screen displayed on the touch panel 14 of the operation terminal 10 having received information from the on-board device 100. The display screen is displayed on the touch panel 14 under control by the display control unit 21 of the operation terminal 10.

Figure 5:
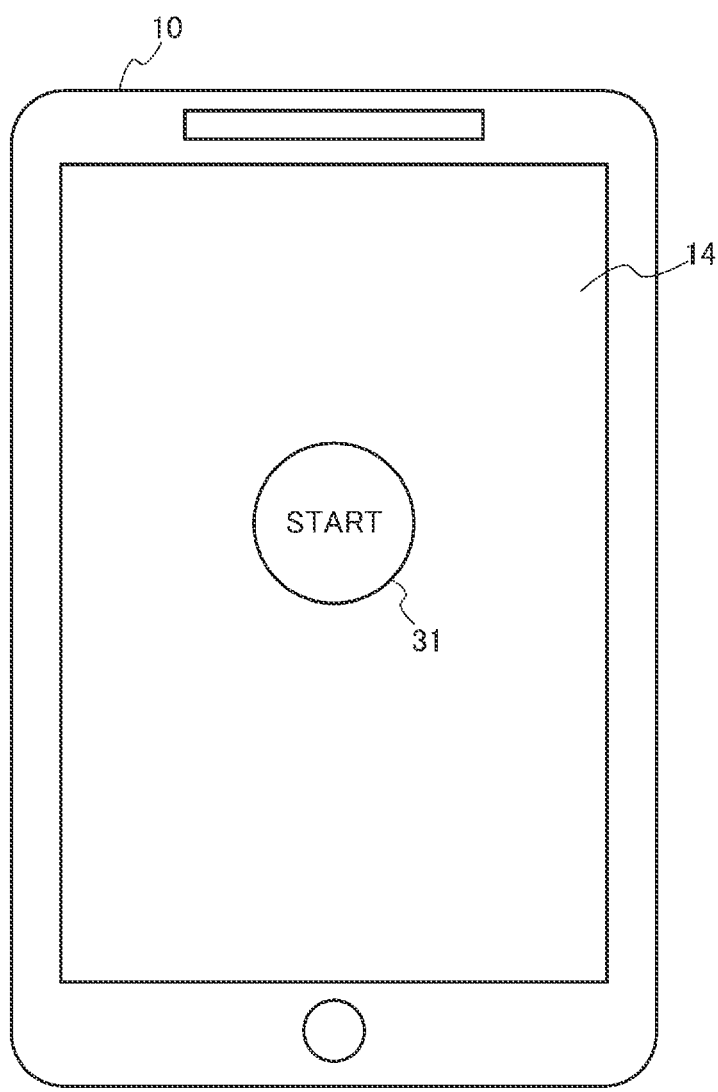
FIG. 5 is a diagram illustrating a display screen displayed on a touch panel.

FIG. 5 illustrates a display screen on which a start button 31 for causing the on-board device 100 to start parking support is displayed. When a parking support application is activated through an operation from the user 3, the display screen illustrated in FIG. 5 is displayed on the touch panel 14. When the user 3 presses down the start button 31 illustrated in FIG. 5, parking support by the on-board device 100 is started.

Figure 6:
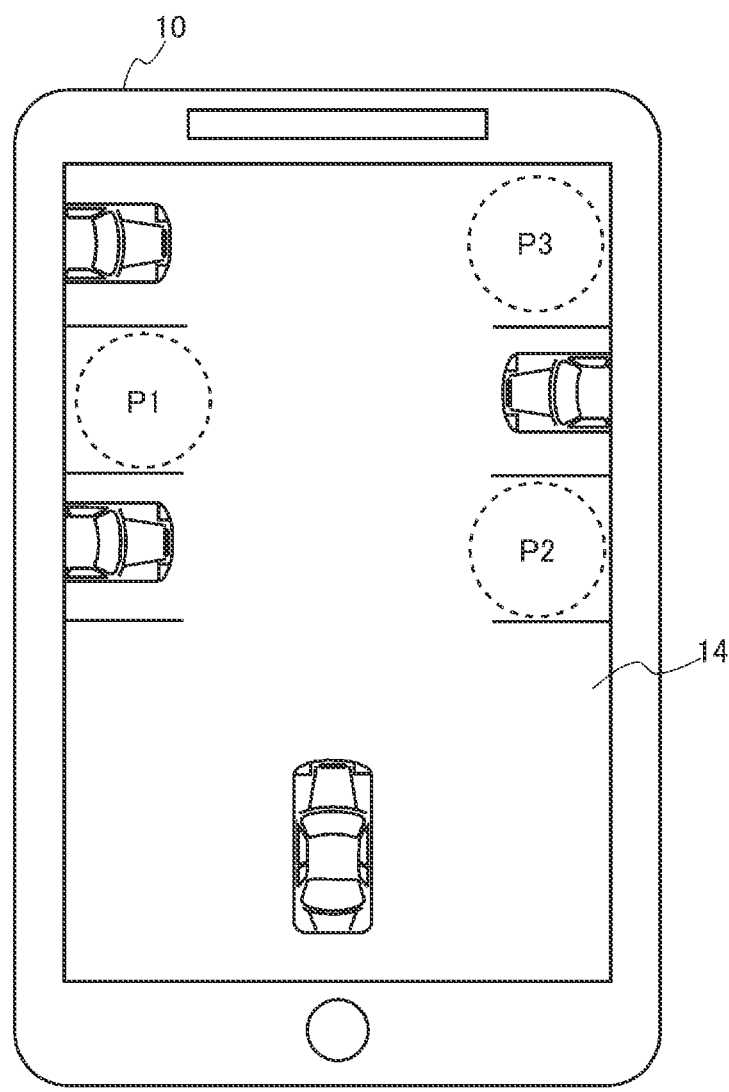
FIG. 6 is a diagram illustrating a display screen displayed on the touch panel.

FIG. 6 is a diagram illustrating a display screen of the touch panel 14 on which a position selection image received from the on-board device 100 is displayed.

As illustrated in FIG. 6, the position of each parking possible region detected by the parking support device 160 is indicated by a figure or a symbol in the position selection image. FIG. 6 illustrates the position selection image in which a circular figure indicating the position of each parking possible region and an identification number identifying the parking possible region are displayed. When one of the parking possible regions is selected by the user 3 through a touch operation on the touch panel 14, the operation terminal 10 transmits the identification number indicating the selected parking possible region to the on-board device 100.

Figure 7:
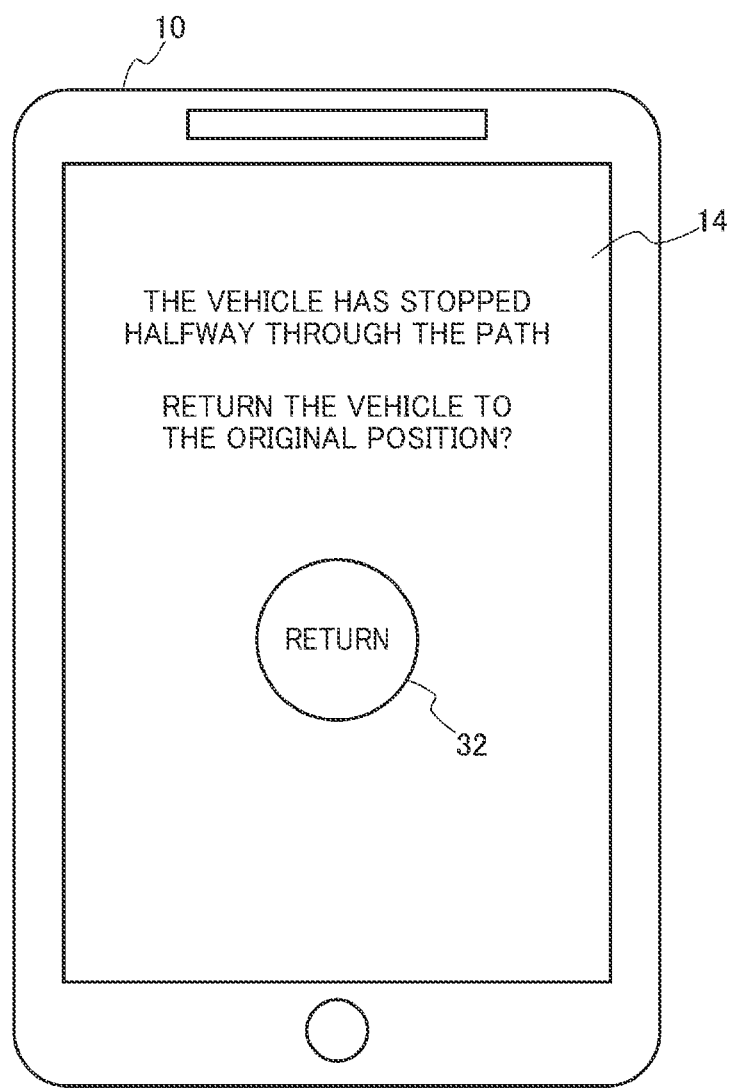
FIG. 7 is a diagram illustrating a display screen displayed on the touch panel.

FIG. 7 is a diagram illustrating a display screen displayed on the touch panel 14 when the own-vehicle 5 has emergently stopped. A guide notifying that the own-vehicle 5 has emergently stopped halfway through the travel path R1 is displayed on the display screen illustrated in FIG. 7. In addition, a guide querying whether to return the position of the own-vehicle 5 to the start position P1 or the middle position P2 is displayed on the display screen illustrated in FIG. 7. Moreover, a return button 32 for starting control to return the position of the own-vehicle 5 to the start position P1 or the middle position P2 is displayed on the display screen illustrated in FIG. 7. When the user 3 presses down the return button 32, the operation terminal 10 causes the touch panel 14 to display a display screen illustrated in FIG. 8.

Figure 8:
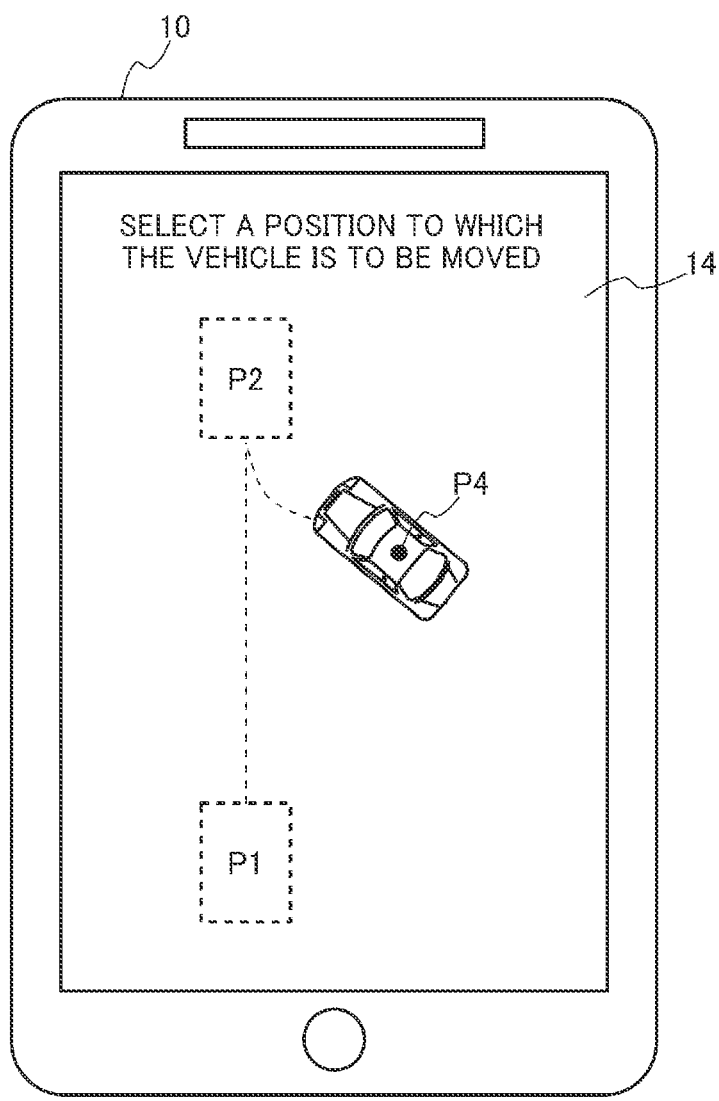
FIG. 8 is a diagram illustrating a display screen displayed on the touch panel.

FIG. 8 is a diagram illustrating a display screen through which a return position is selected. The return position is a position to which the own-vehicle 5 is to be returned from the emergency stop position P4. For example, when the obstacle 7 or the like exists at the emergency stop position P4, the user 3 cannot get on the own-vehicle 5 or has difficulties in getting on the own-vehicle 5 in some cases. Thus, the user 3 operates the operation terminal 10 to specify the return position to which the position of the own-vehicle 5 is to be returned.

The display screen illustrated in FIG. 8 is a screen displayed on the touch panel 14 of the operation terminal 10 when the determination unit 177 of the parking support device 160 has determined that the own-vehicle 5 can be returned to the start position P1 and the middle position P2. This display screen displays an image illustrating a positional relation between the emergency stop position P4 at which the own-vehicle 5 has emergently stopped and the return position. The user 3 selects, through a touch operation, the start position P1 or the middle position P2 displayed as the return position.

When the determination unit 177 has determined that the own-vehicle 5 can be returned to the middle position P2, only the middle position P2 is displayed as the return position on the touch panel 14, and thus a guide "returning to the middle position P2" may be displayed on the touch panel 14 of the operation terminal 10.

The information generation unit 23 of the operation terminal 10 generates specification information to be transmitted to the on-board device 100 in accordance with operation contents of a touch operation by the user 3. The specification information specifies the return position to which the own-vehicle 5 is to be moved. For example, when having received an operation to select the middle position P2, the information generation unit 23 generates specification information specifying the middle position P2 as the return position and transmits the generated specification information to the on-board device 100. When having received an operation to select the start position P1, the information generation unit 23 generates specification information specifying the start position P1 as the return position and transmits the generated specification information to the on-board device 100.

Figure 9:
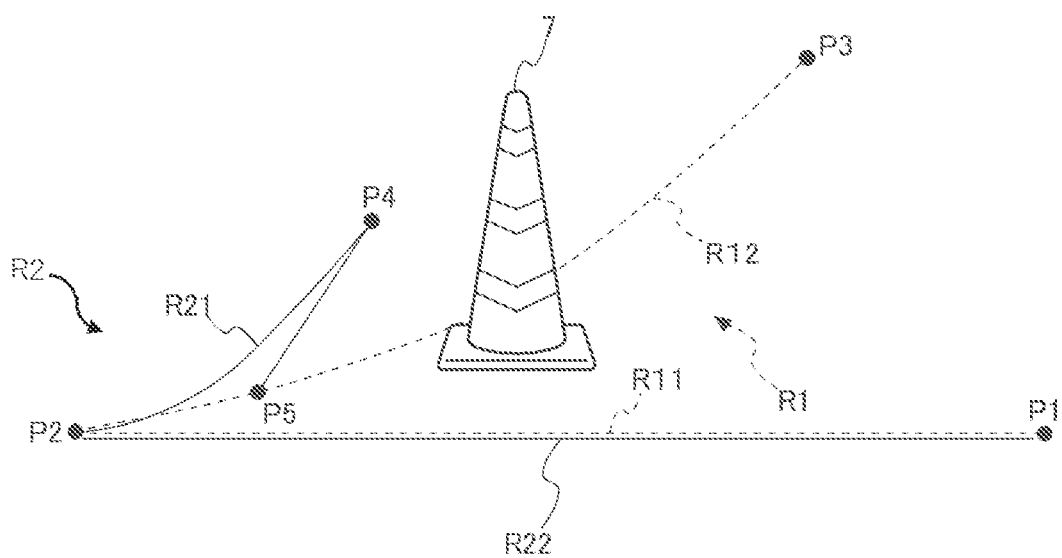
FIG. 9 is a diagram illustrating a travel path when the own-vehicle has emergently stopped.

FIG. 9 is a diagram illustrating travel paths R1 and R2.

In FIG. 9, the travel path R1 is illustrated with a dashed line, the travel path R2 is illustrated with a solid line. The travel path R1 is a path through which the own-vehicle 5 is to be parked at a target parking position, and the travel path R2 is a path through which the position of the own-vehicle 5 is to be returned from the emergency stop position P4 to the return position.

The travel path R1 illustrated in FIG. 9 includes paths R11 and R12. The travel path R1 also includes a start position P1, a middle position P2, and a target parking position P3. The travel path R2 illustrated in FIG. 9 includes paths R21 and R22. The travel path R2 also includes an emergency stop position P4, the middle position P2, and the target parking position P3.

Assume that the obstacle 7 is detected at a position P5 on the path R12 by the vehicle control unit 150, the vehicle control unit 150 executes evasive travel, and the own-vehicle 5 is deviated from the path R12. When contact with the obstacle 7 cannot be evaded despite execution of the evasive travel, the vehicle control unit 150 emergently stops the own-vehicle 5. Assume that the own-vehicle 5 has emergently stopped at the emergency stop position P4 illustrated in FIG. 9.

The travel control unit 176 sets, as a new travel path R2, a returning path to the return position specified by specification information received from the operation terminal 10. When the own-vehicle 5 has emergently stopped, the travel control unit 176 causes the path generation unit 175 to generate the path R21 from the emergency stop position P4 to the middle position P2. In some cases, the own-vehicle 5 is off the path R12 when evasive travel is executed by the vehicle control unit 150, and this is why the determination unit 177 causes the path generation unit 175 to generate the path R21 from the emergency stop position P4 to the middle position P2.

When the return position selected by the operation terminal 10 is the middle position P2, the travel control unit 176 sets, as a new travel path R2, the path R21 generated by the path generation unit 175. The travel control unit 176 generates control information for causing the own-vehicle 5 to travel along the set travel path R2.

When the return position selected by the operation terminal 10 is the start position P1, the travel control unit 176 sets, as the travel path R2, the path R21 generated by the path generation unit 175 and a returning path on the travel path R1 from the middle position P2 to the start position P1. The travel control unit 176 generates control information for causing the own-vehicle 5 to travel along the set travel path R2.

The following describes a reason why the determination unit 177 does not cause the path generation unit 175 to generate a path from the middle position P2 to the start position P1.

On the travel path R1 illustrated in FIG. 9, the emergency stop position P4 is a position after the middle position P2. Specifically, the own-vehicle 5 stops at the emergency stop position P4 after having passed through the middle position P2. In other words, the own-vehicle 5 has already traveled through the path R11 of the travel path R1. Thus, a path through which the own-vehicle 5 is to be moved from the middle position P2 as an end point of the path R11 to the start position P1 as a starting point of the path R11 can be used as part of the travel path R2 unless a new obstacle 7 is detected after the own-vehicle 5 has passed.

When the emergency stop position P4 at which the own-vehicle 5 has emergently stopped is on the travel path R1, the travel control unit 176 may set, as the travel path R2, a returning path on the path R12 from the emergency stop position P4 to the middle position P2 and a returning path on the path R11 from the middle position P2 to the start position P1. Accordingly, the travel control unit 176 may generate control information of the travel path R2 by using control information of the already generated travel path R1 without causing the path generation unit 175 to generate a new path.

Figure 10:
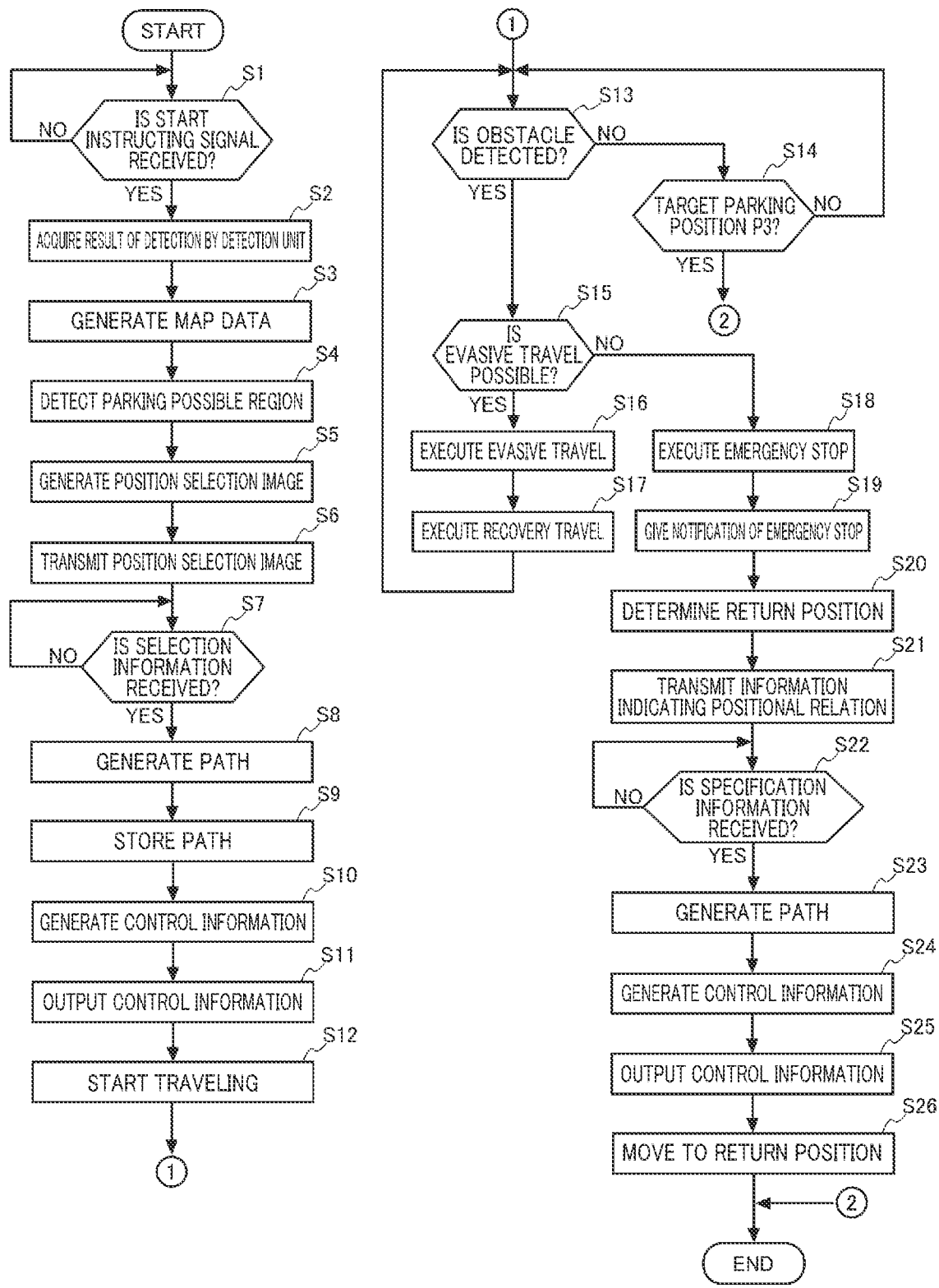
FIG. 10 is a flowchart illustrating operation of an on-board device.

FIG. 10 is a flowchart illustrating operation of the on-board device 100.

The operation of the on-board device 100 will be described below with reference to the flowchart illustrated in FIG. 10.

The parking support device 160 starts parking support when the start button 31 displayed on the touch panel 14 of the operation terminal 10 is pressed down and a signal that instructs start of parking support is received from the operation terminal 10.

When the signal that instructs start of parking support is not received (NO at step S1), the parking support device 160 waits to start processing until the signal that instructs start of parking support is received. When the signal that instructs start of parking support is received (YES at step S1), the parking support device 160 first acquires a result of detection by the detection unit 130 (step S2). The parking support device 160 acquires, as the result of detection by the detection unit 130, an image captured by the camera unit 131 and sensor values of the sonar units 133. The parking support device 160 generates, based on a result of analysis of the acquired captured image and the sensor values of the sonar units 133, map data in which the current position of the own-vehicle 5, the position of the obstacle 7, and the like are recorded (step S3).

Subsequently, the parking support device 160 detects a parking possible region based on the generated map data (step S4). The parking support device 160 detects any parking partition line by analyzing the captured image and detects a parking possible region in which no other vehicle is parked based on a result of the detection of the parking partition line and the map data. When having detected a parking possible region, the parking support device 160 generates a position selection image by superimposing, on the captured image, a figure indicating the position of the parking possible region, and an identification number identifying the parking possible region (step S5). The parking support device 160 transmits the generated position selection image to the operation terminal 10 (step S6).

Subsequently, the parking support device 160 determines whether selection information is received from the operation terminal 10 (step S7). The selection information includes information indicating a parking possible region selected through an operation from the user 3. When the selection information is not received (NO at step S7), the parking support device 160 waits until the selection information is received. When the selection information is received (YES at step S7), the parking support device 160 sets a target parking position P3 in the parking possible region specified by the received selection information, and generates a path through which the own-vehicle 5 is to travel to the set target parking position P3 (step S8). The parking support device 160 stores information of the generated path in the memory 165 (step S9). Step S8 corresponds to a generation step of the present invention.

Subsequently, the parking support device 160 sets the generated path as the travel path R1 through which the own-vehicle 5 is to travel, and generates control information for causing the own-vehicle 5 to travel along the travel path R1 (step S10). The parking support device 160 outputs the generated control information to the vehicle control unit 150 (step S11). The vehicle control unit 150 controls drive of the steering device 151, the drive device 153, the braking device 155, and the speed change device 157 in accordance with the control information so that the own-vehicle 5 starts automated travel along the travel path R1 (step S12). Steps S10 and S11 correspond to an output step of the present invention.

When the own-vehicle 5 has started traveling by automated driving, the vehicle control unit 150 detects any obstacle 7 based on an analysis result obtained by analyzing a captured image generated by the camera unit 131, and sensor values of the sonar units 133 (step S13). When no obstacle 7 is detected (NO at step S13), the vehicle control unit 150 determines whether the own-vehicle 5 has reached the target parking position P3 (step S14). When the own-vehicle 5 has not reached the target parking position P3 (NO at step S14), the vehicle control unit 150 returns to step S13 and resumes detection of any obstacle 7. When the own-vehicle 5 has reached the target parking position P3 (YES at step S14), the vehicle control unit 150 transmits, to the operation terminal 10, a completion notification that parking at the target parking position P3 is completed, and then ends the processing.

When an obstacle 7 is detected (YES at step S13), the vehicle control unit 150 determines whether evasive travel in which traveling is performed while contact with the detected obstacle 7 is evaded is possible (step S15). Steps S13 and S15 correspond to a determination step of the present invention. When having determined that evasive travel is possible (YES at step S15), the vehicle control unit 150 executes evasive travel in which the travel path R1 is deviated, thereby evading contact with the obstacle 7 (step S16). Once contact with the obstacle 7 is evaded by the evasive travel, the vehicle control unit 150 executes recovery travel to return the travel path of the own-vehicle 5 to the travel path R1 (step S17).

When having determined that evasive travel is not possible (NO at step S15), the vehicle control unit 150 emergently stops the own-vehicle 5 (step S18), outputs a notification signal to the parking support device 160, and notifies the parking support device 160 that the own-vehicle 5 has emergently stopped (step S19).

The parking support device 160 determines that the own-vehicle 5 has emergently stopped at the emergency stop position P4 when the notification signal is input from the vehicle control unit 150, a duration for which the own-vehicle 5 has been stopping is determined to be equal to or longer than a predetermined time based on a sensor value of the vehicle speed sensor, a position at which the own-vehicle 5 has stopped is not the target parking position P3, and an obstacle 7 is detected in the traveling direction of the own-vehicle 5 based on an image captured by the camera unit 131 and sensor values of the sonar units 133.

When having determined that the own-vehicle 5 has emergently stopped, the parking support device 160 determines a return position to which the own-vehicle 5 can return from the emergency stop position P4 (step S20). When the emergency stop position P4 is before the middle position P2, the parking support device 160 determines whether the own-vehicle 5 can return from the emergency stop position P4 to the start position P1 along the travel path R1. When the emergency stop position P4 is after the middle position P2, the parking support device 160 determines whether the own-vehicle 5 can return from the emergency stop position P4 to the middle position P2 and the start position P1 along the travel path R1.

Having determined the return position, the parking support device 160 notifies the operation terminal 10 that the own-vehicle 5 has emergently stopped, and controls the wireless communication unit 110 to transmit, to the operation terminal 10, information indicating a positional relation between the emergency stop position P4 on the travel path R1 and the return position (step S21).

The operation terminal 10 generates data of a display screen to be displayed on the touch panel 14 based on the information received from the on-board device 100 and displays the generated display screen data on the touch panel 14. Accordingly, the display screen illustrated in FIG. 8 is displayed on the touch panel 14 of the operation terminal 10.

The user 3 refers to the display screen displayed on the touch panel 14 and selects a return position through a touch operation on the touch panel 14. The operation terminal 10 transmits specification information specifying the selected return position to the on-board device 100.

The parking support device 160 determines whether the specification information specifying the return position is received from the operation terminal 10 (step S22). When the specification information is not received (NO at step S22), the parking support device 160 waits until the specification information is received.

When the specification information is received (YES at step S22), the parking support device 160 generates a returning path to the return position specified by the received specification information (step S23). In this case, when the specified return position is the middle position P2, the parking support device 160 causes the path generation unit 175 to generate a new path R21. The path R21 is a path through which the own-vehicle 5 is to travel from the emergency stop position P4 to the middle position P2.

The parking support device 160 sets the generated path R21 as the travel path R2 through which the own-vehicle 5 is to travel, and outputs information of the set travel path R2 to the travel control unit 176. When the selected return position is the start position P1, the parking support device 160 sets, as the travel path R2, a path including the path R21 generated by the path generation unit 175 and the path R11 as part of the travel path R1, and outputs information of the set travel path R2 to the travel control unit 176.

Thereafter, the parking support device 160 generates control information for causing the own-vehicle 5 to travel along the travel path R2 (step S24), and outputs the generated control information to the vehicle control unit 150 (step S25). The vehicle control unit 150 controls drive of the steering device 151, the drive device 153, the braking device 155, and the speed change device 157 in accordance with the control information so that the own-vehicle 5 travels along the travel path R2 and moves to the return position (step S26). Thereafter, the parking support device 160 notifies the operation terminal 10 that the own-vehicle 5 has moved to the return position.

Figure 11:
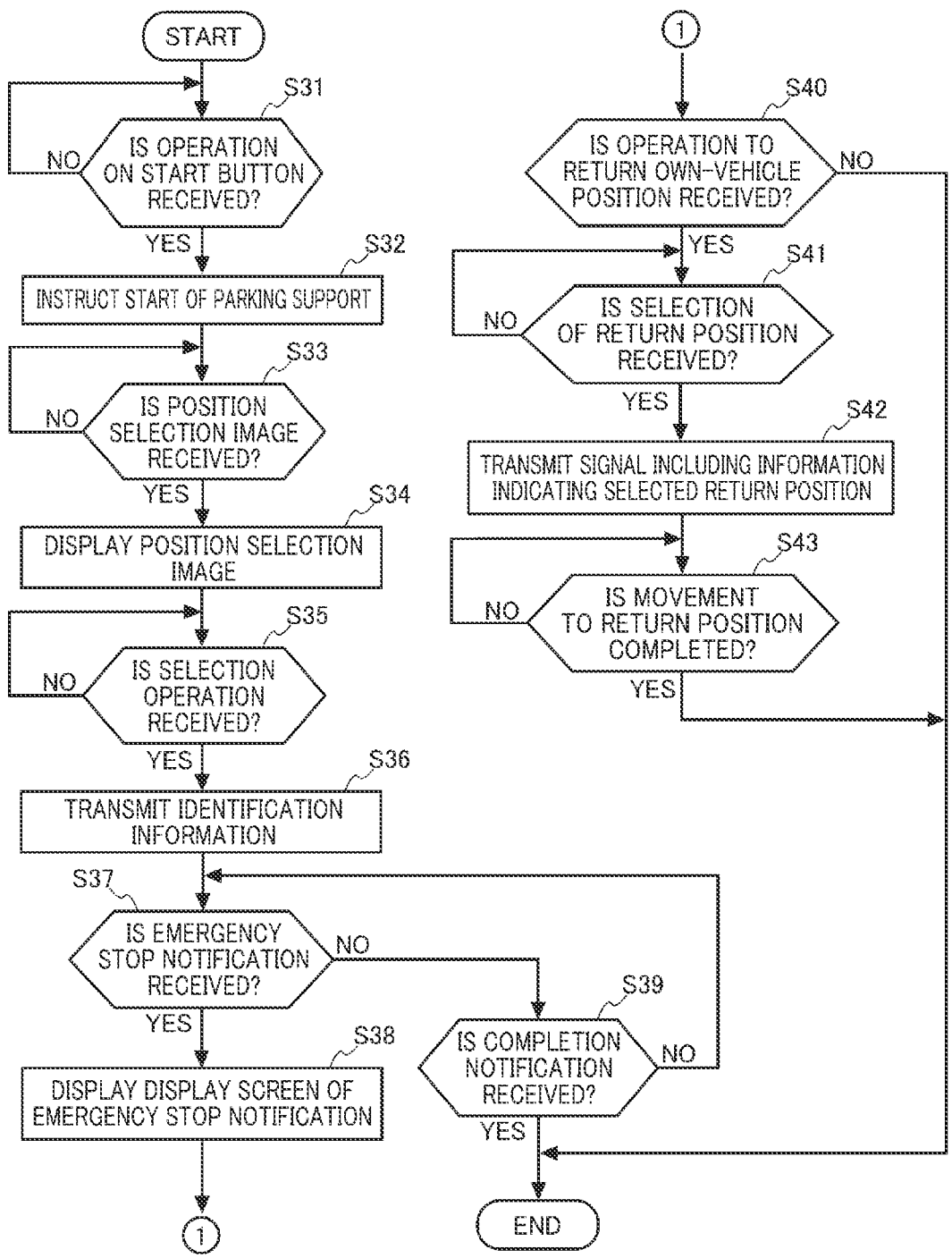
FIG. 11 is a flowchart illustrating operation of an operation terminal.

FIG. 11 is a flowchart illustrating operation of the operation terminal 10.

The operation of the operation terminal 10 will be described below with reference to the flowchart illustrated in FIG. 11.

When an application program is selected through a touch operation, the control unit 20 causes the touch panel 14 to display the display screen illustrated in FIG. 5. Having caused the touch panel 14 to display the display screen illustrated in FIG. 5, the control unit 20 determines whether an operation on the start button 31 is received (step S31).

When an operation on the start button 31 is not received (NO at step S31), the control unit 20 waits until an operation on the start button 31 is received. When an operation on the start button 31 is received (YES at step S31), the control unit 20 transmits, to the on-board device 100, a signal that instructs start of parking support (step S32). When the signal that instructs start of parking support is received from the operation terminal 10, the parking support device 160 generates a position selection image by performing processing at steps S2 to S5 illustrated in FIG. 10, and controls the wireless communication unit 110 to transmit the generated position selection image to the operation terminal 10.

The control unit 20 waits until the position selection image is received from the on-board device 100 (NO at step S33). When the position selection image is received (YES at step S33), the control unit 20 causes the touch panel 14 to display the position selection image illustrated in FIG. 6 (step S34). A figure indicating the position of a parking possible region, and an identification number identifying the parking possible region are displayed in the position selection image.

The control unit 20 determines whether a selection operation to select one parking possible region displayed on the position selection image is received (step S35). When one parking possible region is selected by the user 3 through a touch operation on the touch panel 14, the operation terminal 10 transmits identification information identifying the selected parking possible region to the on-board device 100 (step S36).

Subsequently, the control unit 20 determines whether an emergency stop notification is received from the on-board device 100 (step S37). When the emergency stop notification is not received (NO at step S37), the control unit 20 determines whether a completion notification indicating completion of parking at the target parking position P3 is received (step S39). When the completion notification is not received (NO at step S39), the control unit 20 returns to the determination at step S37. When the completion notification is received (YES at step S39), the control unit 20 ends the present processing flow.

When the emergency stop notification is received from the on-board device 100 (YES at step S37), the control unit 20 causes the touch panel 14 to display the display screen illustrated in FIG. 7, which indicates that the own-vehicle 5 has stopped halfway through a travel path R (step S38). Then, the control unit 20 determines whether an operation to return the position of the own-vehicle 5 to the start position P1 or the middle position P2 is received, specifically, whether an operation on the return button 32 is received (step S40).

When the operation to return the own-vehicle 5 to the start position P1 or the middle position P2 is not received (NO at step S40), the control unit 20 ends the present processing flow. The user 3 moves to the own-vehicle 5 having emergently stopped, and removes the obstacle 7 blocking the traveling path of the own-vehicle 5.

When an operation to return the own-vehicle 5 to the start position P1 or the middle position P2 is received (YES at step S40), the control unit 20 causes the touch panel 14 to display the display screen illustrated in FIG. 8 and receives an operation to select a return position (step S41). The control unit 20 waits until an operation to select a return position is received (NO at step S41). When an operation to select a return position is received (YES at step S41), the control unit 20 transmits, to the on-board device 100, a signal including information indicating the selected return position (step S42). Thereafter, the control unit 20 determines whether a signal notifying that the own-vehicle 5 has moved to the return position is received (step S43). When the signal notifying that the own-vehicle 5 has moved to the return position is not received (NO at step S43), the control unit 20 waits until the signal is received. When the signal notifying that the own-vehicle 5 has moved to the return position is received (YES at step S43), the control unit 20 ends the present processing flow.

As described above, the parking support device 160 of the present embodiment includes the path generation unit 175, the travel control unit 176, and the determination unit 177.

The path generation unit 175 generates the travel path R1 through which the own-vehicle 5 is to be parked at the target parking position P3. The travel control unit 176 generates control information for causing the own-vehicle 5 to travel in accordance with the travel path R1, and outputs the generated control information to the vehicle control unit 150 that controls travel of the own-vehicle 5. The determination unit 177 determines whether the own-vehicle 5 has become unable to proceed in a traveling direction corresponding to the travel path R1 and has stopped halfway through the travel path R1.

When the own-vehicle 5 has stopped, the determination unit 177 causes the wireless communication unit 110 to transmit, to the operation terminal 10, information indicating the travel path R1 and a place at which the own-vehicle 5 has stopped on the travel path R1.

When specification information specifying a place to which the own-vehicle 5 is to be moved is received from the operation terminal 10, the travel control unit 176 outputs, to the vehicle control unit 150, control information for moving the own-vehicle 5 to the place indicated by the specification information.

Thus, according to the present embodiment, when the own-vehicle 5 has become unable to proceed in the traveling direction and has stopped, it is possible to move the own-vehicle 5 to a position specified by the operation terminal 10. Thus, it is possible to improve convenience when the own-vehicle 5 has become unable to proceed in the traveling direction halfway through the travel path R1.

The determination unit 177 causes the wireless communication unit 110 to transmit, to the operation terminal 10, information indicating a path through which the own-vehicle 5 has already traveled in the travel path R1.

When information specifying a place on a travel path through which the own-vehicle 5 has already traveled is received as the specification information, the travel control unit 176 sets, as the travel path R2 of the own-vehicle 5, a returning path on the travel path R1 to the place specified by the specification information, and generates control information for causing the own-vehicle 5 to travel in accordance with the returning path set as the travel path R2.

The own-vehicle 5 can be moved to the place specified by the specification information by returning on the travel path R1 through which the own-vehicle 5 has already traveled. Since the own-vehicle 5 has already traveled through the returning path on the travel path R1, it is highly likely that the returning path is a path on which no obstacle nor the like exists and traveling is possible. Thus, probability that the own-vehicle 5 can be moved to the specified place can be increased.

When the travel path R1 through which the own-vehicle 5 has already traveled includes the middle position P2 at which the own-vehicle 5 has changed the traveling direction from forward to backward or from backward to forward, the determination unit 177 causes the wireless communication unit 110 to transmit, to the operation terminal 10, information indicating the start position P1 on the travel path R1 and the middle position P2.

When information specifying the middle position P2 or the start position P1 is received as specification information from the operation terminal 10, the travel control unit 176 sets, as the travel path R2 of the own-vehicle 5, a returning path on the travel path R1 from the place at which the own-vehicle 5 has stopped on the travel path R1 to the middle position P2 or the start position P1 specified by the specification information. In addition, the travel control unit 176 generates control information for causing the own-vehicle 5 to travel in accordance with the returning path set as the travel path R2.

Thus, the own-vehicle 5 can be moved to the middle position P2 or the start position P1 by returning the travel path R1 through which the own-vehicle 5 has already traveled. Since the own-vehicle 5 has already traveled through a returning path on the travel path R1, it is highly likely that the returning path is a path on which no obstacle nor the like exists and traveling is possible. Thus, probability that the own-vehicle 5 can be moved to the specified place can be increased.

The determination unit 177 determines, based on a result of detection by the detection unit 130 configured to detect an obstacle, whether the own-vehicle 5 can return to the middle position P2 and the start position P1 along the travel path R1 through which the own-vehicle 5 has already traveled.

When the own-vehicle 5 can return to the start position P1, the determination unit 177 causes the wireless communication unit 110 to transmit information of the middle position P2 and the start position P1 to the operation terminal 10. When the own-vehicle 5 can return to the middle position P2, the determination unit 177 causes the wireless communication unit 110 to transmit information of the middle position P2 to the operation terminal 10.

When information specifying the middle position P2 is received as specification information from the operation terminal 10, the travel control unit 176 sets, as the travel path R2 of the own-vehicle 5, a returning path on the travel path R1 from the place at which the own-vehicle 5 has stopped on the travel path R1 to the middle position P2.

When information specifying the start position P1 is received as specification information from the operation terminal 10, the travel control unit 176 sets, as the travel path R2 of the own-vehicle 5, a returning path on the travel path R1 from the place at which the own-vehicle 5 has stopped on the travel path R1 to the start position P1.

Thus, the operation terminal 10 can be notified of a position to which the position of the own-vehicle 5 can be returned. The own-vehicle 5 can be moved to the specified middle position P2 or start position P1 by returning on the travel path R1 through which the own-vehicle 5 has already traveled.

The travel control unit 176 causes the path generation unit 175 to generate a returning path by using at least part of a path from the current position to a target parking position, and sets, as the travel path R2 of the own-vehicle 5, the returning path generated by the path generation unit 175.

Thus, it is possible to shorten a time taken for setting the travel path R2.

[Modification]

Figure 12:
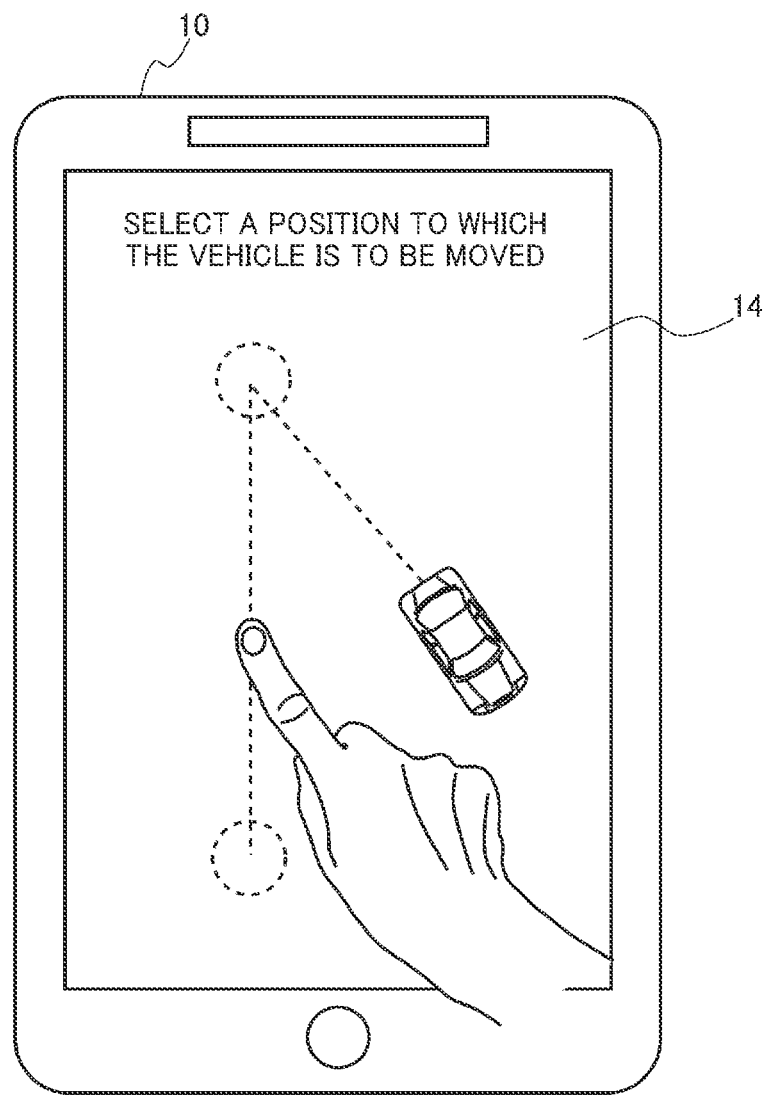
FIG. 12 is a diagram illustrating a display screen displayed on the touch panel in a modification.

In the above-described embodiment, a return position to which the own-vehicle 5 can return when the own-vehicle 5 has emergently stopped is limited to the middle position P2 or the start position P1. In this modification, as illustrated in FIG. 12, the travel path R1 from the start position P1 to the emergency stop position P4 is displayed on the touch panel 14 of the operation terminal 10, and a return position on the travel path R1 from the start position P1 to the emergency stop position P4 is selected through a touch operation by the user 3. A place specified on the travel path R1 through the touch operation by the user 3 is referred to as a specification place. The operation terminal 10 transmits information of the specification place to the on-board device 100.

When the information of the specification place is received from the operation terminal 10, the parking support device 160 determines whether the own-vehicle 5 can travel from the emergency stop position P4 to the specification place. The parking support device 160 determines, based on an image captured by the camera unit 131 and sensor values of the sonar units 133, whether the own-vehicle 5 can return on the travel path R1 from the emergency stop position P4 to the specification place.

When having determined that the own-vehicle 5 cannot travel to the specification place, the parking support device 160 controls the wireless communication unit 110 to transmit, to the operation terminal 10, information indicating that movement is impossible. When having determined that the own-vehicle 5 can travel to the specification place, the parking support device 160 controls the wireless communication unit 110 to transmit, to the operation terminal 10, information indicating that movement is possible.

When the information indicating that movement is impossible is received from the parking support device 160, the operation terminal 10 prompts the user 3 to select again a return position to which the own-vehicle 5 is to be moved.

When the information that movement is possible is received from the parking support device 160, the operation terminal 10 causes the touch panel 14 to display that the own-vehicle 5 can be moved to the selected return position and to display, on a display screen of the touch panel 14, a start button for causing the own-vehicle 5 to start traveling. When the user 3 presses down the start button, the operation terminal 10 transmits, to the on-board device 100, a signal instructing the own-vehicle 5 to start traveling. When the signal instructing traveling start is received from the operation terminal 10, the parking support device 160 causes the own-vehicle 5 to travel to the specification place in accordance with the procedures at steps S23 to S26 illustrated in FIG. 10.

Although this modification describes a case in which a place included in the travel path R1 from the start position P1 to the emergency stop position P4 is selected as a return position, it is possible to specify a place not on the travel path R1. For example, the parking support device 160 may receive selection of a place within a predetermined distance from the travel path R1 by the user 3. In this case, the parking support device 160 calculates all paths again, time is needed until the own-vehicle 5 starts movement.

The above-described embodiment exemplarily describes an aspect of the present invention and may be optionally modified and applied without departing from the scope of the present invention.

For example, in the above-described embodiment, the parking support device 160 determines whether the own-vehicle 5 can return on the travel path R1 from the emergency stop position P4 to the middle position P2 and the start position P1, and notifies the operation terminal 10 of a position to which the returning is possible.

In another method, the middle position P2 or the start position P1 may be selected through an operation on the operation terminal 10, and whether the own-vehicle 5 can return on the travel path R1 to the selected middle position P2 or start position P1 may be determined. When the returning is possible, the parking support device 160, the own-vehicle 5 is caused to travel to a selected return position. When the returning is impossible, the parking support device 160 prompts the user 3 to select a return position again.

Blocks illustrated in FIG. 2 correspond to a schematic diagram in which components of the on-board device 100 are classified in accordance with main processing contents to facilitate understanding of the present application invention, and the components may be classified into a larger number of components in accordance with processing contents. In addition, one component may be classified to execute a larger number of pieces of processing.

When a parking support method of the present invention is achieved by using a computer, a computer program executed by the computer may be configured as a recording medium or a transmission medium that transmits the computer program. The recording medium may be a magnetic or optical recording medium or a semiconductor memory device. Specifically, examples of the recording medium include a flexible disk, a hard disk drive (HDD), a compact disk read only memory (CD-ROM), a DVD, a Blu-ray (registered trademark) Disc, a magneto-optical disc, a flash memory, and a portable or fixed recording medium such as a card recording medium. Alternatively, the above-described recording medium may be a non-transitory storage device such as a RAM, a ROM, or an HDD included in the parking support device 160.

Units of processing in the flowchart illustrated in FIG. 10 are units divided in accordance with main processing contents to facilitate understanding of processing at the on-board device 100, and the present invention is not limited by a division scheme of the units of processing nor names of the units. The processing at the on-board device 100 may be divided into a larger number of units of processing in accordance with processing contents. In addition, the processing at the on-board device 100 may be divided so that one unit of processing includes a larger number of pieces of processing. This also applies to the flowchart illustrating processing at the operation terminal in FIG. 11.

REFERENCE SIGNS LIST 1 parking support system
3 user
5 vehicle
7 obstacle
10 operation terminal
11 wireless communication unit
12 operation unit
14 touch panel
15 voice input unit
16 voice output unit
20 control unit
31 start button
32 button
100 on-board device
110 wireless communication unit
120 position detection unit
130 detection unit
131 camera unit
133 sonar unit
140 vehicle sensor
150 vehicle control unit
151 steering device
153 drive device
155 braking device
157 speed change device
160 parking support device
165 memory
170 processor
171 communication control unit
172 position acquisition unit
173 map generation unit
174 parking region detection unit
175 path generation unit
176 travel control unit
177 determination unit
P1 start position
P2 middle position
P3 target parking position
P4 emergency stop position
R1, R2 travel path

What is claimed is:

1. A parking support device supporting automated parking of a vehicle and connected to be capable of communicating with an operation terminal used by a user through a wireless communication, the parking support device comprising:
a processor,
wherein the processor
acquires a target parking position selected by the user from the operation terminal by operating the operation terminal;

generates a path through which the vehicle is to be moved from a current position and parked at the target parking position;

sets, as a first travel path of the vehicle, the path generated by the path generation unit and generate first control information for causing the vehicle to travel in accordance with the set first travel path, based on the generated first control information, controls travel of the vehicle;

detects an obstacle at an obstacle detection position on the first travel path based on an image captured by a camera which captures surroundings of the vehicle;

executes evasive travel for evading contact with the detected obstacle and travels the vehicle on a path deviating from the obstacle detection position on the first travel path;

when having determined that evasive travel is not possible, emergently stops the vehicle at an emergency stop position on the path deviating from the obstacle detection position on the first travel path and outputs information notifying travel disabled to the operation terminal;

acquires a middle position on the first travel path from the operation terminal in which the user newly selects by operating the operation terminal; and generates a second travel path to the middle position moving the vehicle from the emergency stop position where the vehicle is emergently stopped, and sets the generated second travel path, and generates second control information to travel the vehicle according to the set second travel path, and controls travel of the vehicle based on the generated second control information, wherein the emergency stop position is different from the obstacle detection position on the first travel path, and based on the second control information, the vehicle travels along the second travel path from the emergency stop position to the middle position.

2. A parking support system comprising:

the parking support device according to claim 1; and the operation terminal connected to be capable of communicating with the parking support device through the wireless communication and remotely controlling the vehicle.

3. A vehicle parking support method of supporting automated parking of a vehicle by a parking support device including a processor connected to be capable of communicating with an operation terminal used by a user through a wireless communication, the parking support method comprising the steps of:

acquiring a target parking position selected by the user from the operation terminal used by the user through the wireless communication by operating the operation terminal;

generating a path through which the vehicle is to be moved from a current position and parked at a target parking position;

setting, as a first travel path of the vehicle, the path generated by the generation step, generating first control information for causing the vehicle to travel in accordance with the set first travel path, and based on the generated first control information controlling travel of the vehicle;

detecting an obstacle at an obstacle detection position on the first travel path based on an image captured by a camera which captures surroundings of the vehicle;

executing evasive travel for evading contact with the detected obstacle and traveling the vehicle on a path deviating from the obstacle detection position on the first travel path;

when having determined that evasive travel is not possible, emergently stopping the vehicle at an emergency stop position on the path deviating from the obstacle detection position on the first travel path and outputting information notifying travel disabled to the operation terminal;

acquiring a middle position on the first travel path from the operation terminal in which the user newly selects by operating the operation terminal; and generating a second travel path to the middle position moving the vehicle from the emergency stop position where the vehicle is emergently stopped, and setting the generated second travel path, and generating second control information to travel the vehicle according to the set second travel path, and controlling travel of the vehicle based on the generated second control information, wherein the emergency stop position is different from the obstacle detection position on the first travel path, and based on the second control information, the vehicle travels along the second travel path from the emergency stop position to the middle position.

* * * * *